US008792666B2

(12) United States Patent
Koike et al.

(10) Patent No.: US 8,792,666 B2
(45) Date of Patent: Jul. 29, 2014

(54) ACOUSTIC APPARATUS

(75) Inventors: Riichiroh Koike, Osaka (JP); Takeshi Hatakeyama, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 390 days.

(21) Appl. No.: 13/069,358

(22) Filed: Mar. 22, 2011

(65) Prior Publication Data

US 2011/0235839 A1 Sep. 29, 2011

(30) Foreign Application Priority Data

Mar. 26, 2010 (JP) ................................ 2010-071968

(51) Int. Cl.

| | |
|---|---|
| ***H04R 1/02*** | (2006.01) |
| ***H04R 9/06*** | (2006.01) |
| ***H04R 5/02*** | (2006.01) |
| ***H04R 5/00*** | (2006.01) |
| ***H04B 3/00*** | (2006.01) |

(52) U.S. Cl.
USPC ................. 381/333; 381/17; 381/18; 381/77; 381/300; 381/302; 381/303; 381/307

(58) Field of Classification Search
CPC ...... H04R 5/02; H04R 2499/15; H04R 5/023; H04R 2499/13; H04R 27/00; H04R 2217/03; H04R 5/04; H04S 1/002; H04S 5/00; H04S 2420/01; H04S 1/005; H04S 3/00; H04S 3/02; H04S 7/301
USPC ........ 381/333, 17, 18, 77, 300, 302, 303, 307
See application file for complete search history.

(56) References Cited

U.S. PATENT DOCUMENTS

| | | | | |
|---|---|---|---|---|
| 6,919,503 | B2 * | 7/2005 | Nishitani et al. | 84/633 |
| 7,343,020 | B2 * | 3/2008 | Thigpen | 381/302 |
| 8,190,438 | B1 * | 5/2012 | Nelissen | 704/274 |
| 2005/0213786 | A1 * | 9/2005 | Kerneis | 381/302 |
| 2006/0110008 | A1 * | 5/2006 | Vertegaal et al. | 382/103 |
| 2006/0285698 | A1 * | 12/2006 | Kong | 381/86 |
| 2007/0126884 | A1 * | 6/2007 | Xu et al. | 348/220.1 |
| 2008/0071177 | A1 * | 3/2008 | Yanagidaira et al. | 600/483 |
| 2009/0154713 | A1 * | 6/2009 | Kamiya | 381/1 |

(Continued)

FOREIGN PATENT DOCUMENTS

| | | |
|---|---|---|
| JP | H05-345549 A | 12/1993 |
| JP | H07-192589 A | 7/1995 |

(Continued)

*Primary Examiner* — Duc Nguyen
*Assistant Examiner* — Sean H Nguyen
(74) *Attorney, Agent, or Firm* — James W. Judge

(57) ABSTRACT

When a listener 10 changes the reclining angle of a backrest part 101*a* of a seat 101 and a head 10*a* of the listener 10 is thereby caused to be present outside an audible area 120*a* of a directional loudspeaker 120 or when the reclining angle of a front seat 100 is changed and the head 10*a* of the listener 10 is thereby caused to be present outside the audible area 120*a* of the directional loudspeaker 120, a distance L2 to an obstacle exceeds 1 m as an upper limit of a standard listening range and it is determined that the head 10*a* of the listener 10 is present beyond the standard listening range, and the audio output of the directional loudspeaker 120 is stopped.

3 Claims, 5 Drawing Sheets

(56) References Cited

U.S. PATENT DOCUMENTS

| | | | | |
|---|---|---|---|---|
| 2009/0180626 | A1 * | 7/2009 | Nakano | 381/17 |
| 2010/0215190 | A1 * | 8/2010 | Itou | 381/94.2 |
| 2010/0272271 | A1 * | 10/2010 | Hayakawa et al. | 381/59 |
| 2011/0254691 | A1 * | 10/2011 | Ooi et al. | 340/635 |
| 2012/0262555 | A1 * | 10/2012 | Chien et al. | 348/51 |

FOREIGN PATENT DOCUMENTS

| | | | | |
|---|---|---|---|---|
| JP | 11-288259 | * | 10/1999 | G09G 5/00 |
| JP | 2005-159446 | A | 6/2005 | |
| JP | 2005-217492 | A | 8/2005 | |
| JP | 2008-022495 | * | 1/2008 | H04S 1/00 |
| JP | 2008-236397 | A | 10/2008 | |

* cited by examiner

ACOUSTIC APPARATUS

CROSS REFERENCE TO RELATED APPLICATION

The disclosure of Japanese Patent Application No. 2010-071968, filed on Mar. 26, 2010, is incorporated herein by reference.

BACKGROUND OF THE INVENTION

1. Field of the Invention

The present invention relates to an acoustic apparatus which is an open type but does not provide a sound to people other than a listener himself or herself in a mobile body such as an aircraft or in space in which a plurality of people are present.

2. Description of the Background Art

In general, when music or the like is enjoyed in an environment in which many people are present, like in a mobile body such as an aircraft, headphones are used to avoid a sound leaking to the nearby area and to allow only the headphone-wearing person to hear.

On the other hand, there is a system which provides music or the like by means of an open-type loudspeaker to alleviate a blocked-up feeling and an oppressive feeling which are caused by the headphones. However, it is impossible to differentiate, among the people being present in the range of hearing the sound from the loudspeaker, between those who want to hear the sound and those who do not want to hear the sound. Therefore, there is a directional acoustic apparatus which is capable of providing a sound to those who want to hear the sound. As a sound source of this directional acoustic apparatus, a loudspeaker using ultrasonic waves is used (for example, refer to U.S. Pat. No. 4,823,908 by the same applicant, which discloses a parametric loudspeaker).

For example, realized in patent document 1 is a system which includes a plurality of directional loudspeakers and a plurality of human body sensors. The system causes no sound to be provided to other people by emitting no sound to a place where nobody is present. In addition, proposed therein is the system which also includes distance sensors and causes information to be changed as needed in accordance with a distance.

In addition, proposed in patent document 2 is a system which allows a listener himself or herself to adjust an angle of a loudspeaker installed in a seat to make a sound inaudible to other people.

Furthermore, proposed in patent document 3 are human detection methods in which a human is thermally detected and in which positional information of a face is detected.

[Patent document 1] Japanese Patent Application Laid-Open Publication No. 2005-159446

[Patent document 2] Japanese Patent Application Laid-Open Publication No. 5-345549

[Patent document 3] Japanese Patent Application Laid-Open Publication No. 7-192589

However, the directional loudspeaker used in each of the above-mentioned patent documents and the like has characteristics in which a sound emitted therefrom travels greatly straight forward and the sound is not attenuated until the sound reaches a remote place. This causes the sound to reach anywhere if there is no obstacle and to be heard by people being present in such a direction.

In addition, because of the characteristics that the sound emitted therefrom travels straight forward, if there is an object having reflecting properties, the sound is reflected by the object and an audible area different from the area to which the sound is originally directed is made.

For example, a directional loudspeaker installed in a seat has a problem in that when an obstacle or a person is not present, the sound is heard by other people (somebody passing nearby and people sitting behind) present on a straight line extending from the directional loudspeaker. In addition, when an obstacle is present, ultrasonic signals may be repeatedly reflected by the obstacle and the sound may be heard by other people.

In addition, a position or an outputting direction of the loudspeaker is likely to be changed by an operation of reclining a front seat irrespective of an intention of a listener himself or herself of the loudspeaker. Therefore, unless outputting of a sound is automatically stopped or reduced before the listener of the loudspeaker adjusts outputting of the sound, a nuisance to other people may be caused.

Moreover, when an obstacle suddenly appears between the loudspeaker and a listener, for example, such as when a meal is served, when a passenger in the next seat goes to the bathroom, or when a listener himself or herself starts to read a magazine or a newspaper, ultrasonic signals are reflected. There are such a variety of conditions under which the ultrasonic signals are reflected, and therefore, it is difficult to individually detect the above-mentioned conditions.

The present invention is to solve the above-mentioned problems, and an object of the present invention is to provide an acoustic apparatus operable to stop or reduce audio in an ensured manner, even when a listener does not intend to stop or reduce the audio, and to cause no sound to be provided to other passengers.

SUMMARY OF THE INVENTION

In order to solve the above-mentioned problems, one aspect of the present invention is directed to an acoustic apparatus for a listener sitting in a seat. The acoustic apparatus includes: a loudspeaker arranged so as to face toward the listener; a detection part for detecting relative positions of the listener and the loudspeaker; and a controller for controlling a magnitude of an audio output from the loudspeaker. The controller stops or reduces the audio output based on the relative positions. In addition, another aspect of the present invention is directed to an acoustic apparatus which includes: a loudspeaker arranged so as to face toward a listener; a listener detection part for detecting the listener sitting in a seat; and a controller for controlling a magnitude of an audio output from the loudspeaker. When the listener is not detected, the controller stops or reduces the audio output.

Thus, when audio outputted from the loudspeaker does not reach a listener due to a change in the relative positions of the listener and the loudspeaker (for example, when the loudspeaker faces toward, for example, the ceiling, instead of facing toward the listener) or when the listener is not detected (for example, when the listener is not present or when an object, such as a magazine, reflecting the audio is present between the loudspeaker and the listener), the audio output is stopped or reduced, thereby allowing no sound to be provided to other people.

According to the present invention, an acoustic apparatus which does not provide a sound to other passengers even in a situation which is not intended by a listener occurs due to a variety of conditions can be realized.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a directional acoustic system according to an embodiment of the present invention will be described with reference to the accompanying drawings. The directional acoustic system adopts an acoustic apparatus according to the present invention.

Figure 1B:
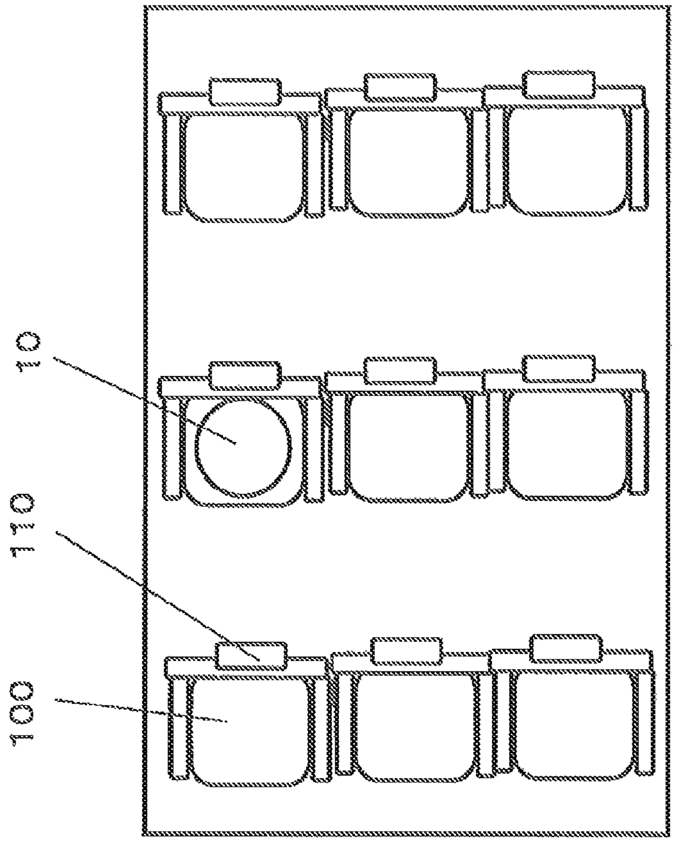
FIG. 1A and FIG. 1B each show an example of a basic layout of an acoustic system in a mobile body.
Figure 1A:
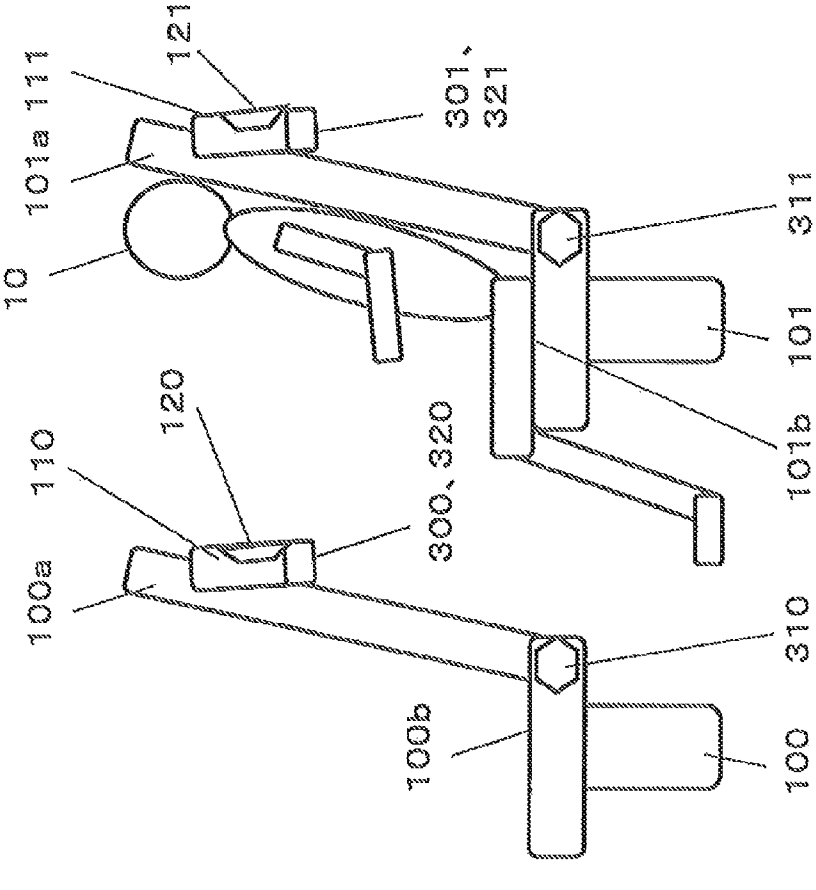
Figure 2:
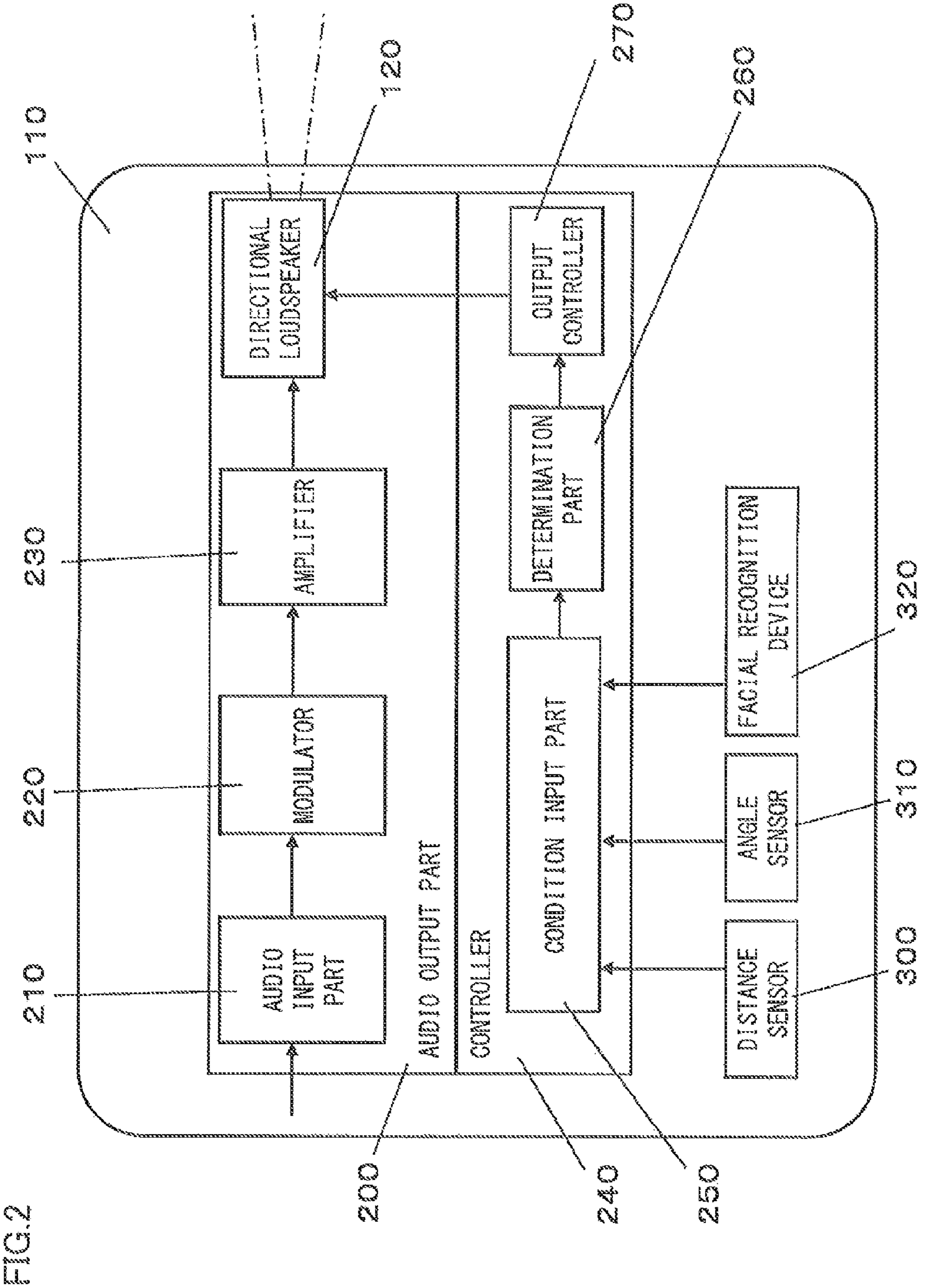
FIG. 2 is a block diagram of a terminal device of a directional acoustic system according to an embodiment of the present invention.
Figure 3:
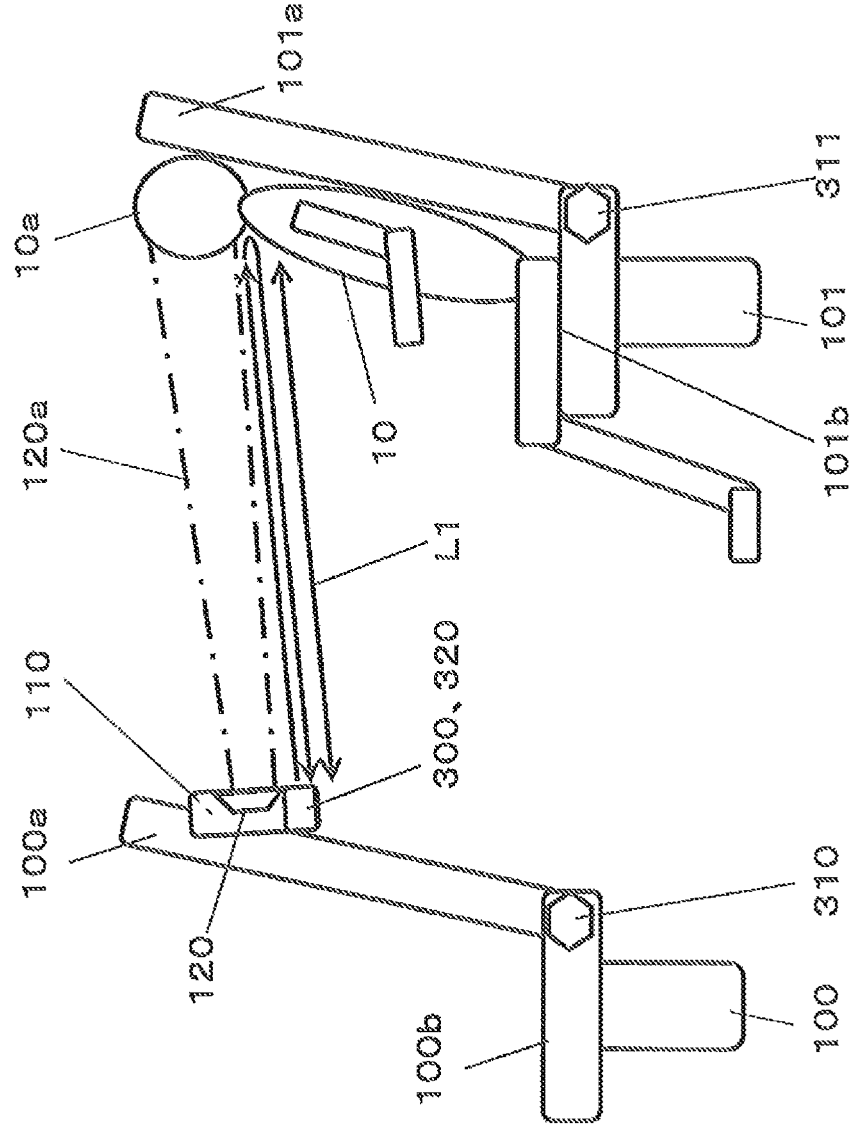
FIG. 3 is an explanatory diagram illustrating a state where a sound is being outputted from the directional acoustic system according to the embodiment of the present invention and a listener is shown listening.

With reference to FIG. 1, FIG. 2, and FIG. 3, the acoustic system including a directional loudspeaker in the embodiment of the present invention will be described.

FIG. 1A and FIG. 1B each show a basic layout of the directional acoustic system in the present embodiment. FIG. 1A is a side view of seats in a room of an aircraft as a mobile body and FIG. 1B is a plan view of a layout of seats.

The seats in the room of the mobile body are fixed and ordinarily each have a reclining function. In the present embodiment, as the reclining function, the example in which only an angle of a backrest part can be changed is shown. However, an angle of a seating face part may be changed in accordance with a change in the angle of the backrest part. In addition, the whole seat may be moved back and forth.

In the aircraft, seats are ordinarily arranged as shown in FIG. 1B. A terminal device 110 is installed in a backrest part 100*a* of a seat 100.

Similarly, a terminal device 111 is installed in a backrest part 101*a* of also a seat 101 in which a listener 10 behind the seat 100 sits. In other words, a plurality of seats are arranged in a specific direction (here, a longitudinal direction of the aircraft) such that listeners face toward the same direction.

The listener 10 watches and listens to the terminal device 110 installed in the front seat 100.

The terminal devices 110 and 111 are equipped with displays (not shown) for displaying contents such as movies, and directional loudspeakers 120 and 121 for outputting sounds. However, only the directional loudspeaker 120 will be described here. This directional loudspeaker has high directivity, and for example, a loudspeaker using ultrasonic waves is used.

In addition, tilt angles of the backrest parts 100*a* and 101*a* of the seats 100 and 101 can be adjusted with respect to the seating face parts 100*b* and 101*b*, respectively.

In addition, in the vicinities of the directional loudspeakers 120 and 121 of the terminal devices 110 and 111, distance sensors 300 and 301 are attached, respectively. Each of the distance sensors 300 and 301 emits, for example, infrared light from an infrared-emitting diode, receives reflected light, obtained when the infrared light is reflected by an obstacle and returns, and calculates a distance to the obstacle by using the voltage value of the reflected light.

In addition, in the substantially same positions as the above-mentioned vicinities thereof, facial recognition devices 320 and 321 for recognizing faces of the listeners 10 are provided.

In addition, positions where the backrest parts 100*a* and 101*a* and the seating face parts 100*b* and 101*b* are connected, angle sensors 310 and 311 for detecting tilt angles of the backrest parts 100*a* and 101*a* with respect to the seating face parts 100*b* and 101*b* are provided, respectively.

The listener 10 can change the angle of the backrest part 101*a* by means of the reclining function to take a posture comfortable to himself or herself and listen to audio by using the directional loudspeaker 120 of the terminal device 110 installed in the seat 100.

With reference to FIG. 2, a configuration of the terminal device 110 used in the directional acoustic system of the present embodiment will be described. FIG. 2 is a block diagram of the terminal device 110. As shown in FIG. 2, the terminal device 110 includes: an audio input part 210 to which an audio signal is inputted; a modulator 220 for modulating the audio signal to an ultrasonic wave to be outputted to the directional loudspeaker 120; and an amplifier 230 for amplifying the ultrasonic wave, which together constitute an audio output part 200.

In addition, the terminal device 110 includes: a distance sensor 300 for measuring a distance to an obstacle; an angle sensor 310 for detecting a reclining angle of the seat 100 or an angle of the terminal device 110 equipped with the directional loudspeaker 120; and a facial recognition device 320 for detecting a face. The terminal device 110 also includes: a condition input part 250 which receives inputs from the distance sensor 300, the angle sensor 310, and the facial recognition device 320; a determination part 260 for determining a result of the condition input part 250; and an output controller 270 for controlling an audio output of the directional loudspeaker 120, which together constitute a controller 240.

Based on the result determined by the determination part 260, the controller 240 determines whether to output audio from the directional loudspeaker 120, and the output controller 270 stops an output of the directional loudspeaker 120, thereby allowing no sound to be provided to other passengers.

Although the directional loudspeaker 120 is installed inside the terminal device 110, the directional loudspeaker 120 may be installed outside of the terminal device 110, for example, inside the backrest part 100*a* of the seat 100.

In the present embodiment, all of the distance sensor 300, the angle sensor 310, and the facial recognition device 320 are installed in the directional acoustic system. However, it is not required to install all of the distance sensor 300, the angle sensor 310, and the facial recognition device 320 therein. A condition or conditions of the configuration may be selected depending on a system. For example, any one of the distance sensor 300, the angle sensor 310, and the facial recognition device 320 may be installed therein, or any of the distance sensor 300, the angle sensor 310, and the facial recognition device 320 may be combined and installed therein.

In addition, the distance sensor 300, the angle sensor 310, and the facial recognition device 320 may be located outside the terminal device 110, instead of being installed inside the terminal device 110.

Furthermore, the distance sensor 300 may be incorporated into the directional loudspeaker 120, and the distance sensor 300 and the directional loudspeaker 120 may be one module.

Next, with reference to FIG. 3, FIG. 4, and FIG. 5, a relationship between the listener 10 and the seats 100 and 101 as well as conditions under which an audio output from the directional loudspeaker 120 is stopped will be described. Three typical conditions will be described.

FIG. 3 shows a state in which the listener 10 is receiving an output from the directional loudspeaker 120 and listening to audio, for example, music.

As shown in FIG. 3, a head 10*a* of the listener 10 is present within an audible area 120*a* of the directional loudspeaker 120, and the output from the directional loudspeaker 120 is audible to only the listener 10 himself or herself.

For example, in a case where as a standard listening range, a distance from the directional loudspeaker 120 to an obstacle is set to be 0.5 to 1 m and a distance L1 to the obstacle, measured by the distance sensor 300, is 0.7 m, the numerical information is sent from the distance sensor 300 to the condition input part 250 and a result of the condition input part 250 is determined by the determination part 260.

In this case, the distance L1 is confirmed to be within the standard listening range, and based on the result determined by the determination part 260, the controller 240 determines that the distance L1 is within the standard listening range and that audio is to be outputted from the directional loudspeaker 120. When the audio is being outputted, the output controller 270 does not stop outputting the audio from the directional loudspeaker 120.

Figure 4:
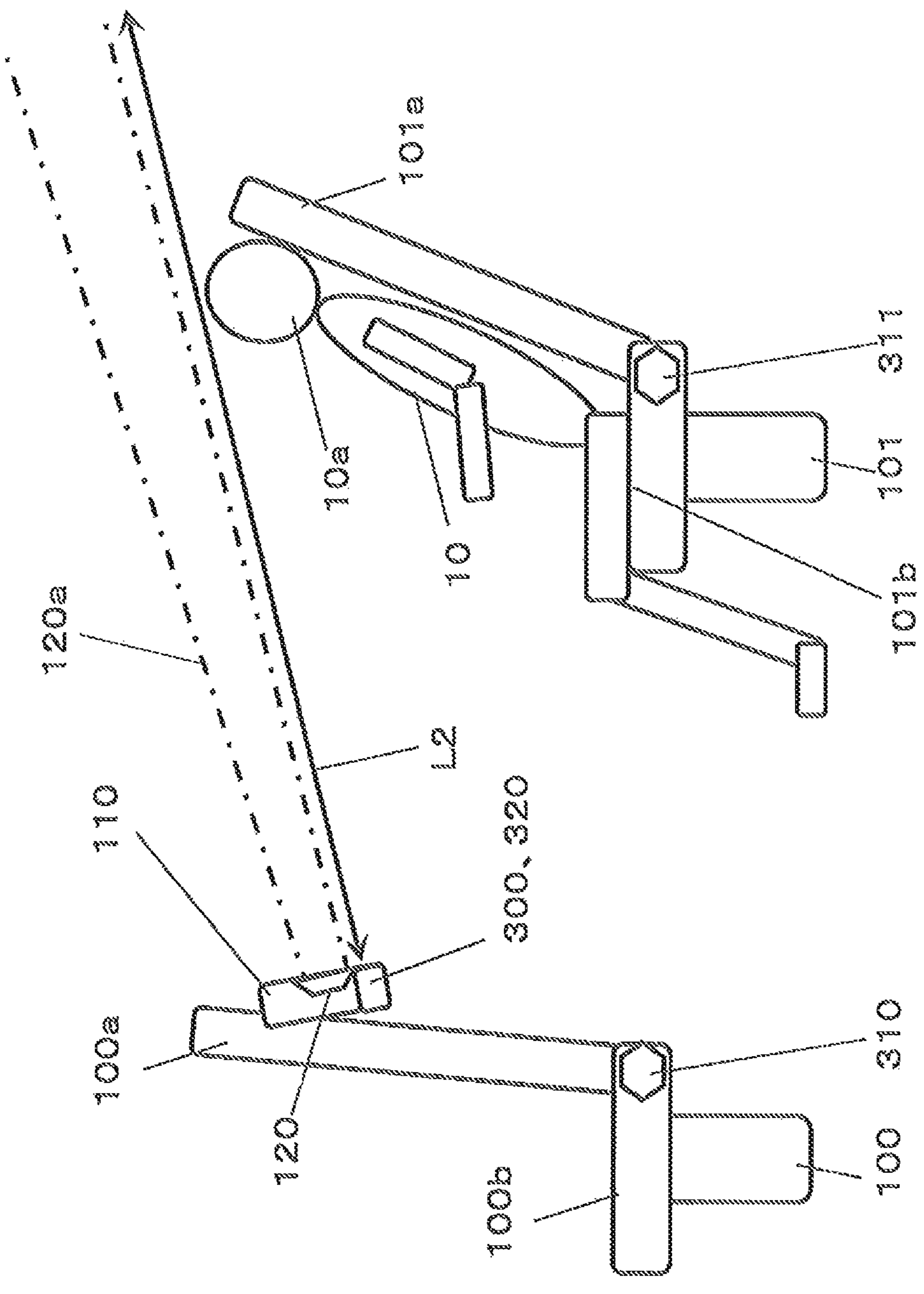
FIG. 4 is an explanatory diagram illustrating a state where a listener in the vicinity of the directional acoustic system according to the embodiment of the present invention is present outside an audible area.

FIG. 4 shows a case where the listener 10 changes a reclining angle of the backrest part 101*a* of the seat 101 and the head 10*a* of the listener 10 is thereby caused to be present outside the audible area 120*a* of the directional loudspeaker 120 or a case where a reclining angle of the front seat 100 is changed and the head 10*a* of the listener 10 is thereby caused to be present outside the audible area 120*a* of the directional loudspeaker 120.

In this case, the distance sensor 300 confirms that a distance L2 to the obstacle exceeds 1 m as the upper limit of the standard listening range, and based on the result determined by the determination part 260, the controller 240 determines that the distance L2 is beyond the standard listening range and that audio is not to be outputted from the directional loudspeaker 120. When the audio is being outputted, the output controller 270 stops outputting the audio from the directional loudspeaker 120.

Figure 5:
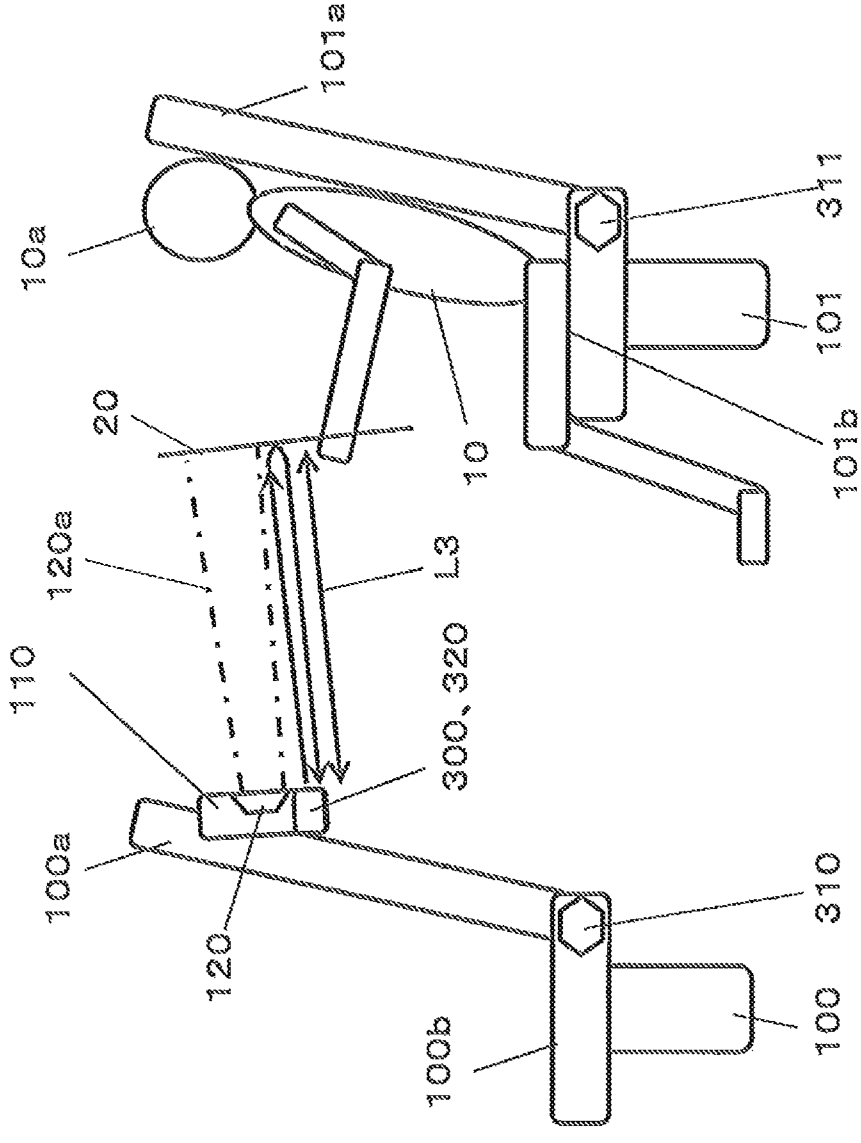
FIG. 5 is an explanatory diagram illustrating a state where an obstacle is present between a listener in the vicinity of the directional acoustic system according to the embodiment of the present invention and a loudspeaker, and the listener is present outside the audible area.

FIG. 5 shows a case where some obstacle enters space between the directional loudspeaker 120 and the listener 10. As an example, it is assumed that the obstacle is a magazine 20 being read by the listener 10.

In the above-mentioned case, the distance sensor 300 measures a distance L3 to the obstacle and when the distance L3 is, for example, 0.3 m, confirms that the distance L3 is less than 0.5 m as the lower limit of the standard listening range. Based on the result determined by the determination part 260, the controller 240 determines that the distance L3 is beyond the standard listening range and that audio is not to be outputted from the directional loudspeaker 120. When the audio is being outputted, the output controller 270 stops outputting the audio from the directional loudspeaker 120.

In the above-mentioned case, based on an angle detected by the angle sensor 310 or the angle sensor 311 or a difference between the angles detected by the angle sensor 310 and the angle sensor 311, it can be inferred and determined whether the head 10*a* of the listener 10 is present within the audible area 120*a* of the directional loudspeaker 120.

In addition, the facial recognition device 320 can determine whether the head 10*a* of the listener 10 is present within the audible area 120*a* of the directional loudspeaker 120 or whether a face of the listener 10 faces toward the loudspeaker 120.

Furthermore, by combining and using a plurality of the sensors and the recognition device among the distance sensor 300, the angle sensor 310, the angle sensor 311, and the facial recognition device 320 or using all of the distance sensor 300, the angle sensor 310, the angle sensor 311, and the facial recognition device 320, whether the listener 10 is present within or beyond the standard listening range can be determined and whether audio is not to be outputted from the directional loudspeaker 120 can be determined. In this case, the threshold values for the determinations can be made variable depending on a system.

In the present embodiment, based on the result determined by the determination part 260, the controller 240 causes the output controller 270 to stop outputting the audio from the directional loudspeaker 120. However, the controller 240 may cause the output controller 270 to only reduce an audio output level, instead of stopping outputting the audio therefrom.

In addition, in the present embodiment, the angle of the backrest part 100*a* or the backrest part 101*a* is detected. However, the angle at which the terminal device 110 equipped with the directional loudspeaker 120 is installed with respect to the backrest part 100*a* may be detected. Further, combining the detection of the angle of the backrest part 100*a* or the backrest part 101*a* and the detection of the angle at which the terminal device 110 equipped with the directional loudspeaker 120 is installed with respect to the backrest part 100*a* enables more accurate detection.

Furthermore, the distance sensor 300 can be realized by providing a receiving sensor in the directional loudspeaker 120 (or in the vicinity thereof). When sound waves outputted from the directional loudspeaker 120 reach an obstacle, the sound waves are reflected by the obstacle to the directional loudspeaker 120 due to the high directivity of the directional loudspeaker 120. The receiving sensor provided in the directional loudspeaker 120 receives the sound waves reflected by the obstacle, and the distance to the obstacle can be calculated from a difference between transmitting timing of the directional loudspeaker 120 and receiving timing of the receiving sensor.

In addition, although the seats referred to in the above description of the present embodiment are economy class seats in the aircraft, the present invention is not limited thereto. For example, the present invention is applicable to the so-called shell seats of business class, first class, or the like. In this case, when the relative positional relationship of the directional loudspeaker and a listener is changed (that is, when a positional relationship in which audio outputted from the directional loudspeaker proceeds toward ears of a listener is changed), outputting the audio from the loudspeaker is stopped or reduced. In the above-mentioned shell seat, the directional loudspeaker may be provided on a lateral side of the seat in the vicinity of a head part of a listener, instead of being provided in front of a listener.

As described above, a comfortable acoustic system which causes no sound to be provided to other passengers can be provided by using the directional acoustic system according to the present embodiment, which utilizes the directional loudspeaker installed in the backrest part of the seat, the distance sensor for detecting a distance to an obstacle, the angle sensor for detecting a reclining angle, and the facial recognition device.

The present invention is applicable to an acoustic system in a mobile body, such as an aircraft, a train, or a bus, in which each seat having a reclining function is equipped with a directional loudspeaker.

While the invention has been described in detail, the foregoing description is in all aspects illustrative and not restrictive. It will be understood that numerous other modifications and variations can be devised without departing from the scope of the invention.

What is claimed is:

1. An acoustic apparatus for a listener sitting in a seat, comprising:

a directional loudspeaker arranged so as to face toward the listener;

a detection part for detecting whether or not the head of the listener is present within an audible area of the directional loudspeaker; and a controller for controlling the magnitude of the audio output from the directional loudspeaker; wherein the controller stops or reduces the audio output when the detection part has detected that the head of the listener is not present within the audible area of the directional loudspeaker;

the seat in which the listener sits includes a backrest and a reclining function for changing a reclining angle of the backrest;

a seat in front of and adjacent to the seat in which the listener sits includes a backrest with the directional loudspeaker installed in a back surface thereof, and the reclining function for changing a reclining angle of the backrest; and the detection part detects whether or not the head of the listener is present within the audible area of the directional speaker, based on an angle difference between the reclining angle of the backrest of the seat in which the listener sits and the reclining angle of the backrest of the front adjacent seat.

2. The acoustic apparatus according to claim 1, wherein the detection part detects the angle difference by using an angle sensor provided on the seat in which the listener sits and an angle sensor provided on the front adjacent seat.

3. The acoustic apparatus according to claim 1, comprising a distance sensor for measuring a distance from the directional loudspeaker to an obstacle on the listener side; wherein:

the detection part detects whether or not the head of the listener is present within the audible area of the directional loudspeaker, based on the angle difference and the distance measured by the distance sensor.

* * * * *